(12) United States Patent
Lundquist et al.

(10) Patent No.: US 9,354,034 B2
(45) Date of Patent: May 31, 2016

(54) POSITIVE LOCATION SYSTEM FOR A LOCOMOTIVE CONSIST

(71) Applicant: Electro-Motive Diesel, Inc., Lagrange, IL (US)

(72) Inventors: Steve D. Lundquist, Naperville, IL (US); Tom Otsubo, Oak Grove, MO (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 588 days.

(21) Appl. No.: 13/789,973

(22) Filed: Mar. 8, 2013

(65) Prior Publication Data

US 2014/0257748 A1 Sep. 11, 2014

(51) Int. Cl.
*G01B 7/00* (2006.01)
*G01B 21/16* (2006.01)
*G01B 7/14* (2006.01)

(52) U.S. Cl.
CPC ........ *G01B 7/003* (2013.01); *G01B 7/14* (2013.01); *G01B 21/16* (2013.01)

(58) Field of Classification Search
CPC ........... G01B 7/003; G01B 7/14; G01B 21/16
USPC ....................... 702/150; 701/19, 20
See application file for complete search history.

(56) References Cited

U.S. PATENT DOCUMENTS

| | | | | |
|---|---|---|---|---|
| 5,969,643 A * | 10/1999 | Curtis | .................... | B61L 3/004 340/933 |
| 7,349,797 B2 * | 3/2008 | Donnelly | .................. | B60L 7/08 105/62.1 |
| 7,618,011 B2 * | 11/2009 | Oleski | .................. | B61L 25/025 246/1 C |
| 8,494,695 B2 * | 7/2013 | Cooper | .................. | H04L 67/14 104/88.01 |
| 8,522,690 B2 * | 9/2013 | Smith | ................. | B61L 15/0027 105/26.05 |
| 8,924,049 B2 * | 12/2014 | Kumar | ........................... | 701/19 |
| 8,942,869 B2 * | 1/2015 | Woo | ....................... | B61L 3/127 246/4 |
| 8,983,759 B2 * | 3/2015 | Smith | ..................... | B61C 17/12 701/117 |
| 9,026,038 B2 * | 5/2015 | Mason | ................ | B61L 15/0027 370/315 |
| 9,026,284 B2 * | 5/2015 | Kumar | .................... | B61L 3/006 701/19 |
| 9,037,323 B2 * | 5/2015 | Kumar | .................... | B61L 3/006 246/182 B |
| 9,043,044 B2 * | 5/2015 | Otsubo | ................. | H04L 12/413 246/186 |
| 9,049,561 B2 * | 6/2015 | Przybylski | ............ | H04W 4/046 |
| 9,096,244 B2 * | 8/2015 | Meyer | ................. | B61L 15/0027 |
| 2011/0051663 A1 * | 3/2011 | Cooper | ................... | H04L 67/14 370/328 |
| 2011/0270475 A1 | 11/2011 | Brand et al. | | |
| 2013/0299645 A1 * | 11/2013 | Cooper | .................. | H04L 67/14 246/122 R |

* cited by examiner

*Primary Examiner* — Carol S Tsai
(74) *Attorney, Agent, or Firm* — Finnegan, Henderson, Farabow, Garrett & Dunner, LLP

(57) ABSTRACT

A positive location system is disclosed for a locomotive consist including at least two locomotives. The system may include a first locator element on a first locomotive and a second locator element on a second locomotive. Each locator element may include a receiving device and a transmitting device communicatively coupled with each other locator element. Each locator element may be configured to determine its own location, relay information on its location to at least one other locator element on another locomotive, receive location information on the at least one other locator element, and determine its own location relative to the location of the at least one other locator element. Each locator element may also provide location information for the at least one other locator element as though it were the at least one other locator element when the at least one other locator element is non-functional.

19 Claims, 4 Drawing Sheets

POSITIVE LOCATION SYSTEM FOR A LOCOMOTIVE CONSIST

TECHNICAL FIELD

The present disclosure is directed to a positive location system and, more particularly, to a positive location system for a locomotive consist.

BACKGROUND

As safety concerns for rail systems become an increasingly important public issue, a need has arisen for implementing an automated control system, such as positive train control (PTC), which incorporates automated systems and processes for controlling a train. Distributed power systems allow locomotives to be distributed throughout a train by utilizing radio communication to remotely control the operation of each locomotive from a lead locomotive. Typically, distributed power systems allow the crew of a train riding in the lead locomotive to monitor and control tractive effort and braking power of multiple train consists comprising one or more locomotives and an associated group of cars. Each locomotive of the train may be operated in either a lead or a remote role thereby allowing train consists to be joined together along high traffic corridors and separated for intermodal or general freight service. In this manner, distributed power systems allow safer, more efficient hauling of all types of freight over all types of terrain. Knowledge of the order and position of locomotives in each train consist, and the exact location of the very front end of the consist at the front end of the train is required to ensure safe operation and handling of the train. However, the order and position of locomotives and cars may periodically change as train consists are joined and separated or cars are added to or removed from a particular consist. Furthermore, position location sensors such as Global Positioning System (GPS) sensors on a locomotive may malfunction or enter an area where they are not able to receive or transmit information regarding their location.

One attempt to improve the safety and efficiency of railroad operations by utilizing a global positioning system to determine relative locomotive position in a train consist is disclosed in U.S. Pat. No. 5,969,643 of Curtis that issued on Oct. 19, 1999 (the '643 patent). The '643 patent provides a system for determining the relative position of locomotives in a consist, wherein the locomotive position information may be utilized to track and verify the configuration of the consist. The system includes a receiver mounted to a remote locomotive within a train consist, with the receiver receiving a reference signal from a global positioning system (GPS) from which a position of the remote locomotive is determined. A processor is operatively coupled to the receiver, and the processor determines a relative position of the remote locomotive in the train consist based on the received signal.

While the system described in the '643 patent may help with tracking and verifying the location of locomotives within a train consist, it may be less than optimal. In particular, the system of the '643 patent does not address situations where particular receivers on certain locomotives are no longer functional for various reasons including malfunctioning electronics and the locomotive being in a tunnel or otherwise obstructed from receiving or sending signals. Additionally, the system of the '643 patent only contemplates determining the position of functioning receivers on the leading and trailing locomotives, and does not provide for determining the location of the very front of a consist or the front of a train.

The present disclosure is directed to overcoming one or more of the problems set forth above and/or other problems in the art.

SUMMARY

In one aspect, the present disclosure is directed to a positive location system for a locomotive consist including a lead locomotive and at least one trailing locomotive. The system may include a first locator element on the lead locomotive, and at least a second locator element located on at least one trailing locomotive. Each locator element on each locomotive may include a receiving device and a transmitting device communicatively coupled with each other locator element on each other locomotive. Each locator element may be further configured to determine its own location, relay the information on its location to at least one other locator element on another locomotive, receive location information on the at least one other locator element, and determine its own location relative to the location of the at least one other locator element. Each locator element may be still further configured to provide location information for the at least one other locator element as though it were the at least one other locator element when the at least one other locator element is non-functional.

In another aspect, the present disclosure is directed to a positive location system for verifying the location of a front end of a train including a lead locomotive and at least one trailing locomotive. The system may include a directional heading indicator associated with one or more of the locomotives in the train, the directional heading indicator configured to provide a signal indicative of whether the associated one or more of the locomotives is facing forward in a direction of travel of the train or facing rearward opposite to the direction of travel of the train. A first locator element may be located on the lead locomotive, and at least a second locator element may be located on at least one trailing locomotive. Each locator element on each locomotive may include a transceiver communicatively coupled with each other locator element on each other locomotive. Each locator element may be configured to determine its own location, store a distance from its location to a front end of the locomotive it is on based upon the signal from the directional heading indicator, receive information on a total length of each locomotive including associated connectors disposed between the locator element and the front end of the train, and determine its own location relative to the front end of the train.

In another aspect, the present disclosure is directed to a method for determining a position of a front end of a locomotive consist having a plurality of locomotives, with each locomotive including a directional heading indicator and a locator element, and each locator element communicatively coupled to each other locator element on each other locomotive. The method may include each locator element determining its own location, relaying the information on its location to at least one other locator element on another locomotive, receiving location information for the at least one other locator element, storing a distance from its location to a front end of the locomotive it is on based upon a signal from the directional heading indicator, receiving information on the total length of each locomotive and its associated connectors disposed between the locator element and the front end of the locomotive consist, and determining its own location relative to the front end of the locomotive consist and relative to the location of the at least one other locator element. The method may further include determining that a locator element on one of the locomotives is non-functional, selecting a functioning locator element on a different locomotive from the locomotive with the non-functional locator element to substitute for the non-functional locator element, and providing location information for the non-functional locator element on one of the locomotives using the functioning locator element on a different locomotive.

DETAILED DESCRIPTION

Figure 1:
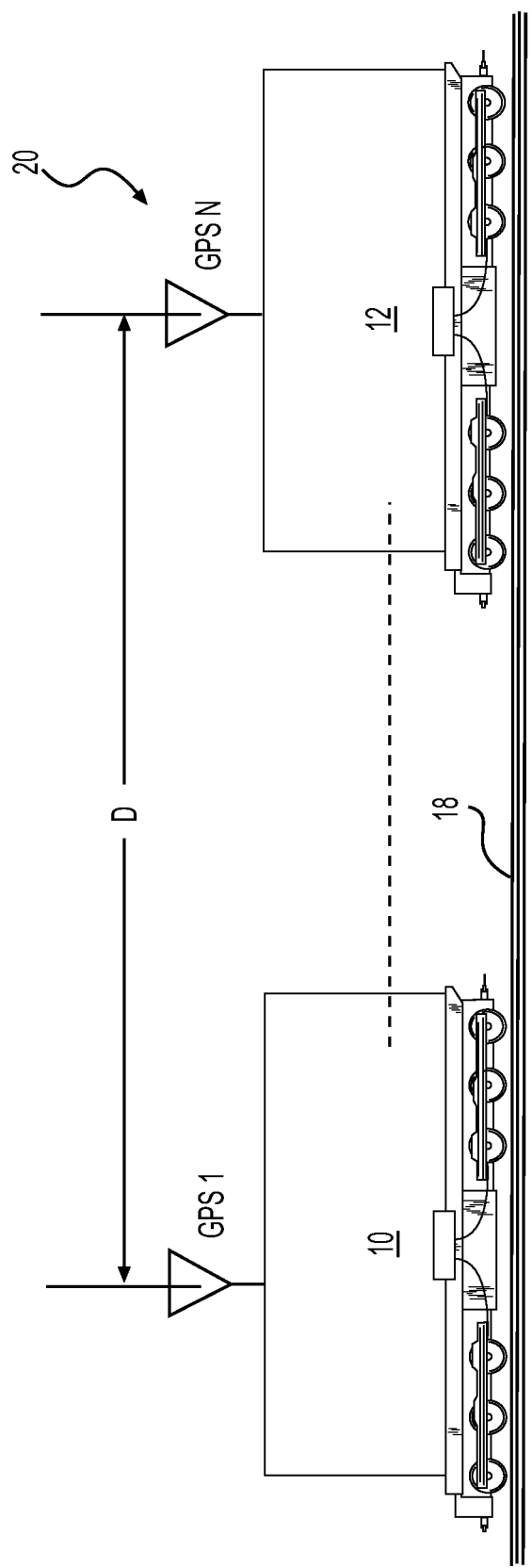
FIG. 1 depicts an exemplary locomotive consist including an exemplary embodiment of a positive location system.

FIG. 1 schematically illustrates an exemplary positive location system that may be implemented on a locomotive consist 20 for a train. Locomotive consist 20 may include a plurality of locomotives coupled to one another, such as locomotives 10 and 12. Each of locomotives 10, 12, may provide power to propel consist 20 along a train track 18. For example, each locomotive 10, 12, may include a diesel engine that provides power to traction devices located on rails of train track 18. Locomotive consist 10 may also include three or more locomotives, and additional freight and/or passenger railcars (not shown) may be coupled to locomotive consist 20. Consist 10 may include any number of locomotives, and any number of railcars may be coupled to or between locomotives 10, 12, depending on the particular requirements of the train. A train may also include more than one locomotive consist, with the locomotive consists spaced apart and including other railcars connected in between the locomotive consists.

Figure 2:
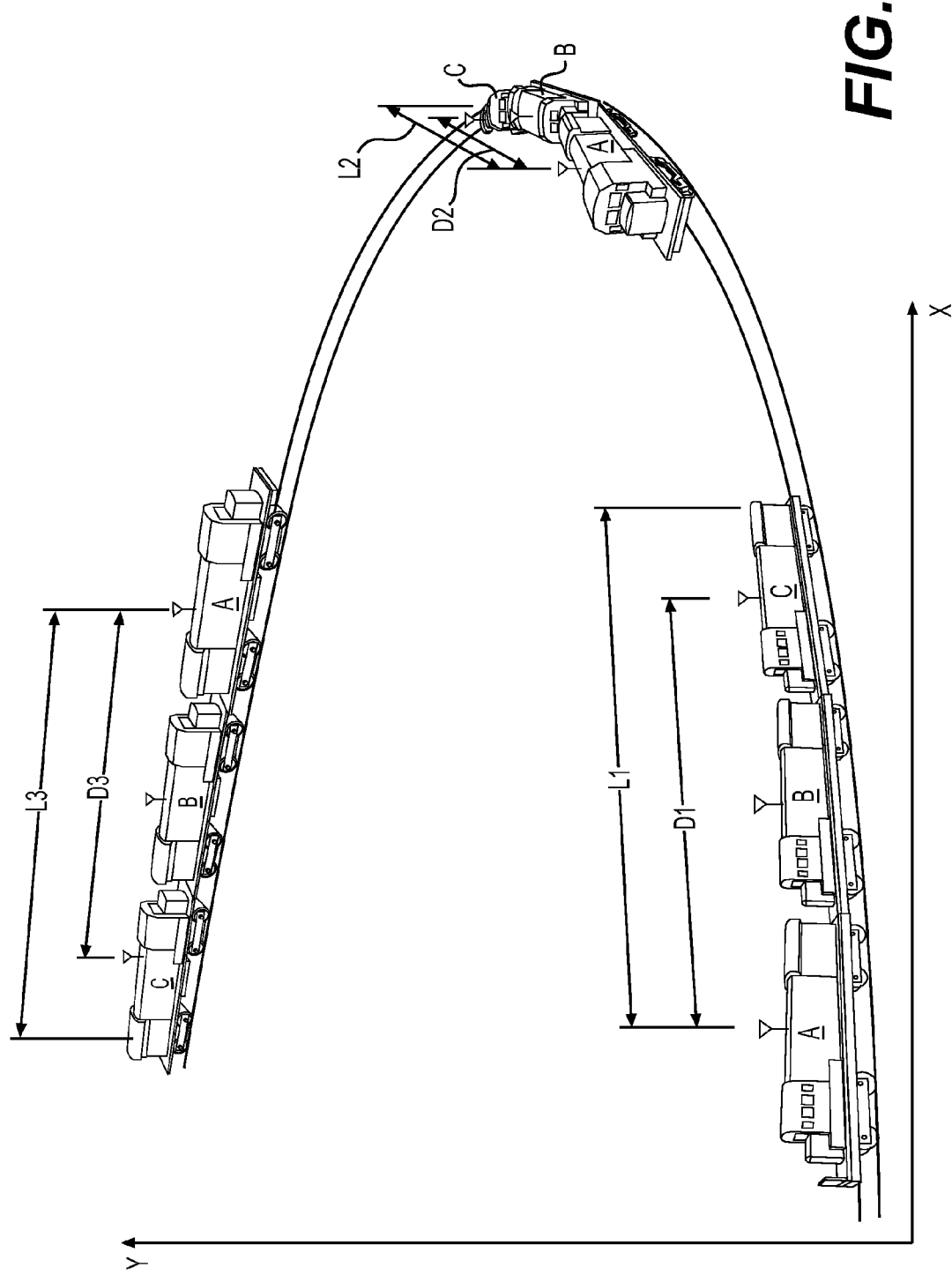
FIG. 2 depicts an exemplary iterative process for determining the true length of a train between two locator elements on spaced locomotives of the train.

As shown in FIG. 2, a locomotive consist may include at least three locomotives A, B, and C. Each locomotive may include a locator element such as $GPS_1$, $GPS_2$, and $GPS_3$ (shown in FIG. 3), respectively, with each locator element positioned on its respective locomotive at a fixed position relative to the front end of the locomotive it is mounted on. One of ordinary skill in the art will recognize that alternative implementations may include multiple locator elements such as GPS receivers on each locomotive. Locator elements may also include devices or systems other than GPS receivers, such as inertial navigation systems or other systems that use processors to calculate position based upon a known initial position and velocity and updated information obtained by integrating information received from various motion sensors such as gyroscopes and accelerometers. Locator elements may include one or more memory or storage devices and one or more processors configured to receive, store, process, and transmit information from various sensors that may include wheel rotational speed sensors, acceleration sensors, laser sensors, gyroscopic sensors, and other motion sensors. Locator elements may also include modules, processors, firmware, circuitry, software, routines, algorithms, or other means configured to calculate the position of each locator element. Position information may also be determined relative to wayside devices such as laser measuring devices or other position determining devices along the track, or relative to known landmarks on a map along a travel route. Position information may also be communicated to and from the locator elements using radio frequency signals, infrared signals, visible light signals, and/or electrical signals.

In some implementations, extra locator elements may be positioned in close proximity to each other, and may serve as redundant locator elements for situations when the electronics on one locator element fail, or the locator element otherwise becomes non-functional. Each locator element may also include a receiving device and a transmitting device communicatively coupled with each other locator element on each locomotive. Each locator element such as $GPS_1$, $GPS_2$, and $GPS_3$, may also be configured to determine its own location, relay information on its location to at least one other locator element on another locomotive, and receive location information on the at least one other locator element. Alternative configurations may include each locator element being communicatively coupled with each other locator element over electrical paths that may include an existing trainline, ethernet cables, or other hardwired or wireless connections.

When two locator elements on two different locomotives are functioning properly, each locator element may be configured to determine its own location and its own location relative to the location of the other locator element. This information may be shared continuously and automatically, so that the information any one locator element on a locomotive has on the other locator elements on different locomotives or on select ones of the locator elements on different locomotives is constantly updated and accurate. Therefore, if a particular locomotive is switched out of a consist at a switching yard, and another locomotive is connected in its place, or other reconfigurations of the consist are implemented, each locator element automatically receives and transmits updated location information regarding the other locator elements.

Each locator element on each locomotive may also be configured to automatically or selectively "fill in" or substitute for any other locator element if that other locator element becomes non-functional. "Non-functional" as used throughout this specification refers to a locator element that is not functioning as intended as a result of faults within the locator element, or for other reasons that may include traveling into a tunnel, passing through an area with heavy electronic interference, or otherwise no longer being able to transmit and/or receive a position signal. The functional locator element filling in or substituting for a non-functional locator element may be configured to provide location information for the non-functional locator element as though it were in exactly the same position as the non-functional locator element. This may be accomplished by adjusting the current location coordinates of the functioning locator element in accordance with the previously determined relative locations of the functioning locator element and the currently non-functional locator element. In various implementations this information may be stored in a database so that it is available at any time when a particular locator element becomes non-functional. Information on the relative positions of two different locator elements may be updated at frequent intervals to account for possible changes in the configurations of the locomotives within a consist. The information may also include the geographical location, track conditions, track curvature, identity of the locomotives on which the locator elements are mounted, and other information that may affect the relative locations of the two locator elements.

The positive location system according to various implementations of this disclosure may include automatic initiation protocols that recognize when a particular locator element has become non-functional. These automatic initiation protocols may be implemented by one or more locator elements or by one or more processors associated with the locator elements. In some implementations the positive location system may be configured to recognize that one or more locator elements are about to enter into a situation where receiving and or transmitting location information will no longer be possible. Alternatively, the system, one or more processors, or one or more locator elements may be configured to implement automatic initiation protocols for any non-functional locator element, or for select associated locator elements that are no longer functioning properly. The system may be further configured to immediately transmit this information to at least one other functional locator element. Upon receiving a signal that a particular locator element on a different locomotive is not functioning properly, a properly functioning locator element may be automatically designated to fill in for that non-functional locator element. Locator elements designated for this purpose may be preselected when both locator elements are functioning properly. Alternatively, substitute locator elements may be chosen at random, chosen based upon availability, or chosen using other selection parameters or algorithms when a locator element becomes non-functional. The locator element that is filling in or substituting for a non-functional locator element may begin to transmit location information as though it were actually in the position of the non-functional locator element. In a consist with multiple locomotives and multiple locator elements positioned on the multiple locomotives, a high level of redundancy may be provided when each different locator element on each different locomotive may be configured to maintain continously updated position information on all other locator elements. Various memory or storage devices and processors may also be provided in association with each locator element to maintain updated information and calculate modifications to be made to position information for a functioning locator element substituting for a non-functioning locator element.

As further shown in FIG. 2, a typical locomotive consist may travel on straight stretches of track the majority of the time, with an occasional curved section of track. When traveling around a curve, the distance $D_2$ between a locator element on locomotive A and another locator element on locomotive C may be shorter than the distance between the same two locator elements when the train is traveling along straight stretches of track, as illustrated by distances $D_1$ and $D_3$. Similarly, the distance $L_2$ between the locator element on locomotive A and the very front end of locomotive C at the front end of the consist may be shorter than the distance between the same two points on the consist when the consist is traveling along straight stretches of track, as illustrated by $L_1$ and $L_3$. In various implementations, the distances between locator elements or between any locator element and a front end of the train or consist may be determined when the train is traveling in a straight line. Position coordinates for each locator element may be determined by various means, and a straight line distance between the position coordinates may be determined by well-known algorithms. When a train is traveling along sections of track that may include curved portions, multiple iterations of determining the position coordinates of selected locator elements and calculating the straight line distance between them may be performed. The greatest value determined for the straight line distance between the selected locator elements may be chosen as the actual distance along the train between the selected locator elements. The greatest value determined for the straight line distance between selected locator elements will occur when the locomotives are traveling along a straight stretch of track.

Methods for determining the location information associated with each locator element on each locomotive may include acquiring Global Positioning System (GPS) data using a GPS receiver, and/or acquiring position information using a Distance Measurement Instrument (DMI), and/or acquiring position information using Inertial Measurement Unit (IMU) data. As an alternative to making iterative determinations of the straight line distance between two locator elements when a train is traveling around a curve, adjustments to the actual distances between the locator elements may be based on information received from various sensors such as accelerometers and gyroscopes. Other alternative implementations may include radar sensors, sonar sensors, laser imaging detection and ranging (LIDAR) sensors, infrared (IR) and non-IR cameras, and similar sensors to provide accurate position information for each locator element. Sensed data may also be compared with data obtained from maps, databases, or other sources of stored information on track conditions, track grade, track curvature, or topographical characteristics. Information obtained and stored during previous trips over the same track may also be retrieved and used in computations of position information for each of the locator elements.

Figure 3:
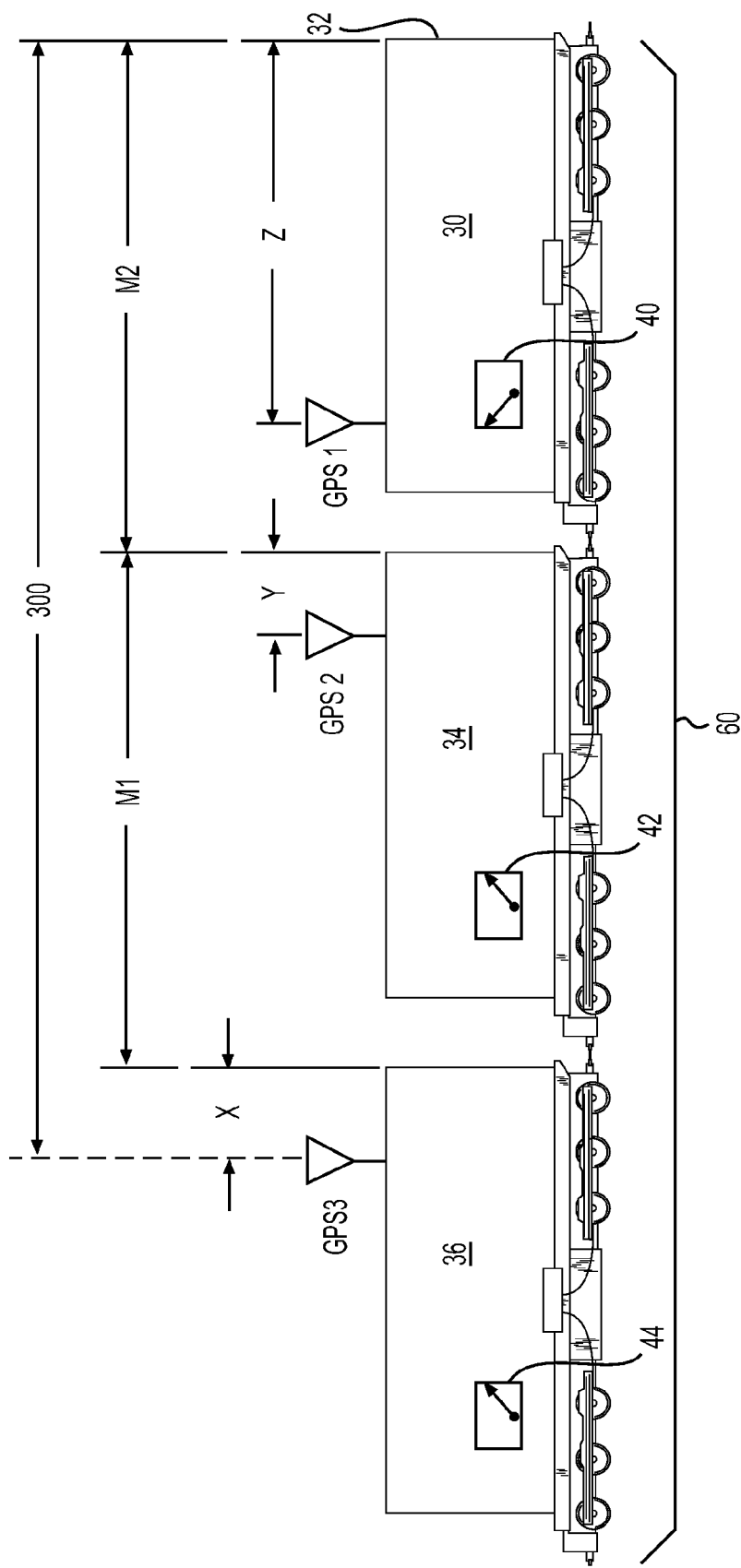
FIG. 3 depicts an exemplary locomotive consist including an exemplary embodiment of the positive location system.

Referring to the exemplary implementation of FIG. 3, each locomotive 30, 34, and 36 in consist 60 may include one or more locomotive control systems configured to electronically control components of each locomotive. Each locomotive 30, 34, 36 may include a locator element such as $GPS_1$, $GPS_2$, $GPS_3$, respectively. Additionally, each locomotive 30, 34, 36 may include a directional heading indicator 40, 42, 44, respectively. Directional heading indicators 40, 42, 44 may each be configured to provide a signal indicative of whether the associated locomotive is facing forward in a direction of travel of the train or facing rearward opposite to the direction of travel of the train. When a locomotive is facing forward in a direction of travel of the train, the locomotive is typically referred to as running short hood forward. When a locomotive is facing rearward opposite to the direction of travel of the train, the locomotive is typically referred to as running long hood forward. The long hood of a locomotive is normally the rear of the locomotive, and contains the diesel engine (prime mover), the main generator or alternator, the locomotive's cooling radiators, dynamic brake resistor grids if so equipped, and most of the locomotive's auxiliary equipment. The locomotive is generally equally capable of running in either direction, and may be connected into a consist in either direction depending on the order or timing of when a particular locomotive arrives at a switching yard or freight loading depot, when or where the locomotive was connected to a consist, the direction of travel of the train, and other factors. As a result, a locator element on a particular locomotive may be positioned at a first distance from the front end of the locomotive in one configuration of the consist, such as when the locomotive is running short hood forward. The same locator element may be positioned at a second distance from the front end of the locomotive different from the first distance when that same locomotive is running long hood forward.

As shown in the exemplary implementation of FIG. 3, a lead locomotive 30 has a front end 32, and trailing locomotives 34 and 36 are connected to lead locomotive 30 to form a locomotive consist 60. A directional heading indicator 40 on lead locomotive 30 indicates that lead locomotive 30 is running long hood forward, with the front end 32 of lead locomotive 30 in the direction of travel of consist 60 actually being what would typically be the rear of lead locomotive 30. In this configuration, a locator element $GPS_1$ on lead locomotive 30 may be positioned at a distance Z from the front end 32 of locomotive 30. In this exemplary implementation, trailing locomotive 34 may be connected to lead locomotive 30 in a short hood forward configuration, as indicated by directional heading indicator 42. A locator element $GPS_2$ on trailing locomotive 34 may be positioned a distance Y from the front end of trailing locomotive 34. Trailing locomotive 36 may be connected to trailing locomotive 34, also in a short hood forward configuration, as indicated by directional heading indicator 44. A locator element $GPS_3$ may be positioned on trailing locomotive 36 at a distance X from the front end of trailing locomotive 36. The total length including connections for lead locomotive 30 is shown as distance $M_2$. The total length including connections for trailing locomotive 34 is shown as $M_1$. $M_1$ and $M_2$ may be different, depending on the types of connections between the locomotives and the types of locomotives provided in consist 60. Each locator element $GPS_1$, $GPS_2$, $GPS_3$ may include a receiving device and a transmitting device, such as may be combined in a transceiver, which enables each locator element to transmit information on its location to each other locator element and receive information on the locations of other locator elements. One of ordinary skill in the art will recognize that the particular configuration shown in FIG. 3 may be varied in many different ways, with greater or lesser numbers of locomotives that may be arranged with some locomotives running short hood forward, some running long hood forward, all running short hood forward, or all running long hood forward.

Each locator element may be configured so that when any other locator element on another locomotive is functioning properly, each of the locator elements may determine its own location, relay information on its location to the other locator element on another locomotive, and receive location information on the other locator element. Each locator element may also determine its own location relative to the location of the other locator element and provide location information for the other locator element as though it were the other locator element when the other locator element is malfunctioning or unavailable. The location information exchanged between locator elements when the locator elements are functioning properly may be stored in memory associated with each locator element. In various implementations of this disclosure, any locator element that is functioning properly may substitute or fill in for any other locator element that is not functioning properly by adjusting its location information in accordance with the relative locations of the two locator elements. The properly functioning locator element may then provide location information for a malfunctioning locator element as though it were that locator element. This feature may provide many layers of redundancy for each locator element by using locator elements on different locomotives, and may avoid the need to slow down or stop a consist when a particular locator element is not functioning properly.

Additionally, each locator element on each locomotive may be configured to determine the location of front end 32 of consist 60. In the exemplary implementation of FIG. 3, locator element $GPS_3$ on trailing locomotive 36 is a distance 300 from front end 32 of consist 60. The distance 300 may be calculated by adding the distance X from locator element $GPS_3$ to the front end of locomotive 36 to the total length $M_1$ of trailing locomotive 34 with connectors and the total length $M_2$ of lead locomotive 30 with connectors. The distances X, Y, Z from each locator element $GPS_3$, $GPS_2$, $GPS_1$ to the respective front end of the locomotive it is on may be determined based at least partially upon the signal from respective directional heading indicators 44, 42, 40.

Locomotive consist 60 may include components of an automated control system (not shown), or may receive control instructions from lead locomotive 30, or from offboard controls at a dispatch center or wayside station. In various implementations, an automated control system may implement a positive train control (PTC) system or any other train control system. The positive location system according to various implementations of this disclosure may provide redundancy and accuracy of position information for each locomotive and for the position of the front end of each locomotive and the consist.

Figure 4:
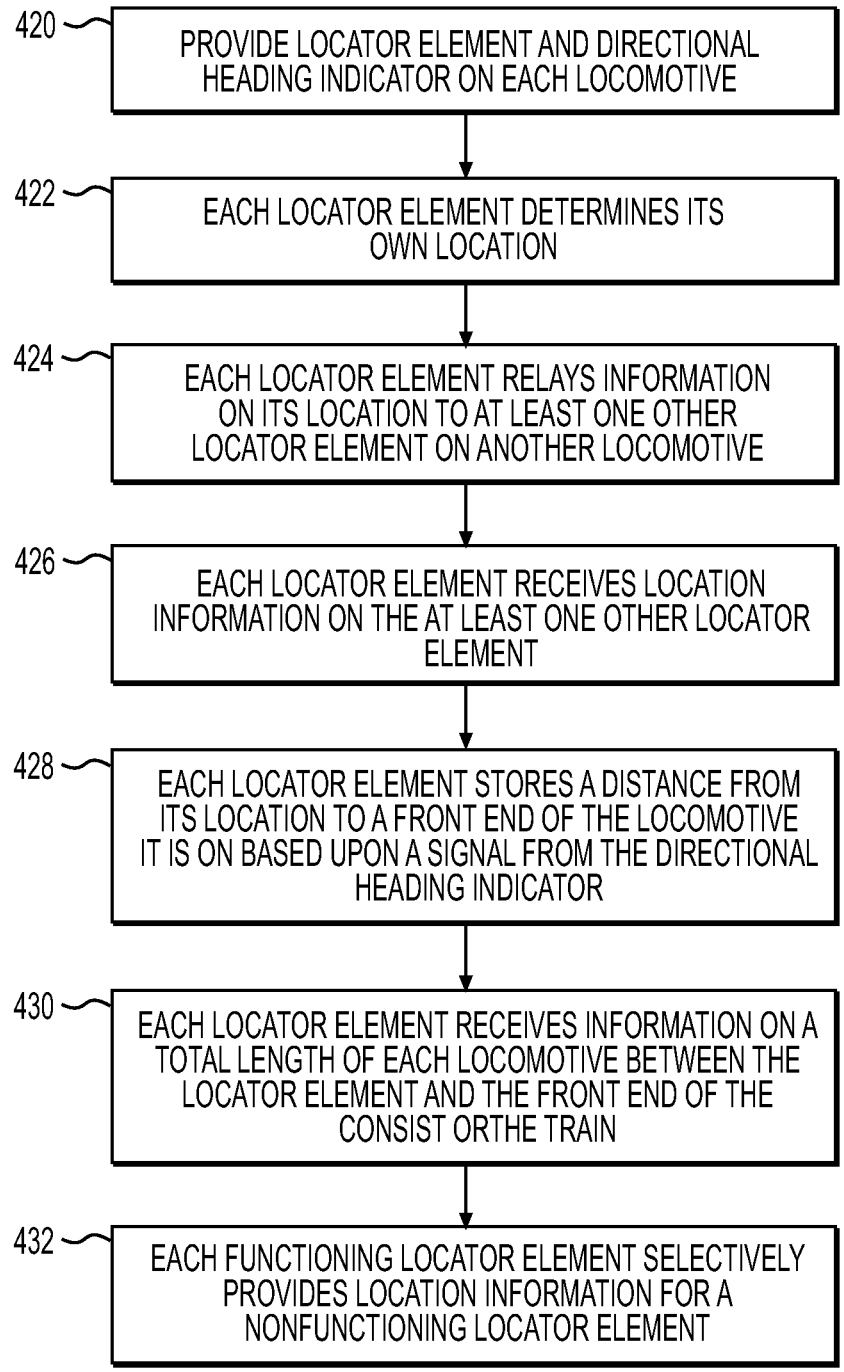
FIG. 4 depicts an exemplary flowchart illustrating steps that may be performed by the positive location system.

FIG. 4 is a flowchart depicting an exemplary disclosed method that may be performed by the embodiment of FIG. 3. FIG. 4 is described in more detail below to further illustrate the disclosed concepts.

INDUSTRIAL APPLICABILITY

The exemplary disclosed system and methods may provide for increased reliability, redundancy, and accuracy of location systems used in the control of locomotive consists. The incorporation of locator elements on each locomotive that may fill in for each other locator element on other locomotives in the consist provides additional layers of redundancy. Input of a signal from a directional heading indicator on each locomotive also allows for accurate determination of the location of the front end of the consist, regardless of how the consist is configured. Accurate and constantly or frequently updated and redundant information on the positions of each locomotive and the positions of the front end of each locomotive, the front end of a consist, and the front end of a train may be required in order to meet safety protocols and regulations. FIG. 4 depicts exemplary processes by which the positive location system may be used in this manner.

As shown in FIG. 4, at step 420, each locomotive in a locomotive consist may be provided with a locator element and a directional heading indicator. A directional heading indicator may be activated by an operator when a locomotive is reconfigured between running short hood forward and running long hood forward. Alternatively, a directional heading indicator may be automatically activated upon any reconfiguration or change in the operational direction of a locomotive. At step 422, each locator element may determine its own location. As described above, a locator element may determine its own location using a GPS receiver, or through other means that may include inertial navigation procedures based on a known initial position and velocity and updated information obtained by integrating information received from various motion sensors such as gyroscopes and accelerometers.

At step 424, each locator element may relay information on its location to at least one other locator element on another locomotive. Information may be relayed between locator elements along wired or wireless paths.

At step 426, each locator element may receive location information on the at least one other locator element. In various exemplary implementations every locator element may receive location information for every other locator element, or only select locator elements may receive location information from certain other locator elements. Locator elements may include one or more data storage devices and/or processing devices.

At step 428, each locator element may store a distance from its location to a front end of the locomotive it is on based at least partially upon a signal from the directional heading indicator. The distances from a locator element to each end of the locomotive it is mounted on may be the same if the locator element is positioned precisely at the middle of the locomotive, or may have different values if the locator element is mounted closer to one end of the locomotive than the other end. Locator elements may be positioned differently depending on the manufacturer, type, year, make, and model of the locomotive, and may be fixedly positioned or adjustably positioned depending on various features of each locomotive.

At step 430, each locator element may receive information on a total length of each locomotive including associated connectors disposed between the locator element and the front end of the consist or the train. This information may be provided as part of locomotive identification information, and may vary depending on the manufacturer, type, year, make, and model of locomotive.

At step 432, each functioning locator element may selectively provide location information for a non-functional locator element. In certain implementations, the pairings between functioning locator elements and non-functional locator elements may be preselected, chosen based upon location of their respective locomotives in a consist, or selected randomly or otherwise based upon the number of functioning and non-functional locator elements available at any particular time. A determination may be made that a particular locator element on one of the locomotives is non-functional. A functioning locator element on a different locomotive from the locomotive with the non-functional locator element may be selected to substitute for the non-functional locator element. When a functioning locator element is selected to fill in or substitute for a non-functional locator element, the functioning locator element may immediately begin transmitting location information for the non-functional locator element. This location information may also be modified based upon other sensed information received by the functioning locator element as the consist travels along track having changing characteristics such as curved portions and straight portions. The sensed information received by a functioning locator element may include information from motion sensors such as gyroscopes and accelerometers. Each locator element may be equipped with the necessary memory or storage devices and one or more processors or other computing devices to receive this various sensed input information and information from maps or other data sources, and perform the calculations required to substitute position information for a non-functional locator element on a different locomotive.

It will be apparent to those skilled in the art that various modifications and variations can be made to the positive location system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A positive location system for a locomotive consist including a lead locomotive and at least one trailing locomotive, the system comprising:
    a first locator element located on the lead locomotive;
    at least a second locator element located on the at least one trailing locomotive;
    each locator element on each locomotive including a receiving device and a transmitting device communicatively coupled with each other locator element on each other locomotive;
    each locator element configured to:
        determine its own location;
        relay information on its location to at least one other locator element on another locomotive;
        receive location information on the at least one other locator element, and determine its own location relative to the location of the at least one other locator element; and
        provide location information for the at least one other locator element as though it were the at least one other locator element when the at least one other locator element is non-functional, wherein:
    the system is further configured to transmit a signal indicative of a locator element becoming non-functional to at least one other functioning locator element when automatic initiation protocols recognize a particular locator element has become non-functional.

2. The system according to claim 1, further including:
    at least one memory device associated with the first locator element, the at least one memory device configured to store location information from the second locator element when both the first and second locator elements are functioning properly; and
    a processor configured to calculate differences between information the first locator element determines on its own location and the stored information from the location of the second locator element, and apply the calculated differences to the information on the location of the first locator element such that the first locator element will substitute for the second locator element when the second locator element is non-functional.

3. The system according to claim 1, wherein select locator elements are configured to automatically fill in for select non-functional locator elements upon receiving a signal that a non-functional locator element is not functioning properly.

4. The system according to claim 3, wherein the select locator elements configured to automatically fill in for select non-functional locator elements are preselected when all of the select locator elements are functioning properly.

5. The system according to claim 3, wherein the select locator elements configured to automatically fill in for select non-functional locator elements are chosen based upon availability when a locator element becomes non-functional.

6. The system according to claim 3, wherein the select locator elements configured to automatically fill in for select non-functional locator elements are chosen in accordance with a predefined algorithm.

7. A positive location system for verifying the location of a front end of a train including a lead locomotive and at least one trailing locomotive, the system comprising:
    a directional heading indicator associated with one or more of the locomotives in the train, the directional heading indicator configured to provide a signal indicative of whether the associated one or more of the locomotives is facing forward in a direction of travel of the train or facing rearward opposite to the direction of travel of the train;
    a first locator element located on the lead locomotive, and at least a second locator element located on at least one trailing locomotive;
    each locator element on each locomotive including a transceiver communicatively coupled with each other locator element on each other locomotive; and
    each locator element being further configured to determine its own location, store a distance from its location to a front end of the locomotive it is on based at least partially upon the signal from the directional heading indicator, receive information on a total length of each locomotive and its associated connectors disposed between the locator element and the front end of the train, and determine its own location relative to the front end of the train.

8. The system according to claim 7, further including:
    at least one memory device associated with the first locator element, the at least one memory device configured to store location information from the second locator element when both the first and second locator elements are functioning properly; and a processor configured to calculate differences between information the first locator element determines on its own location and the stored information on the location of the second locator element, and apply the calculated differences to the information on the location of the first locator element such that the first locator element will substitute for the second locator element when the second locator element is non-functional.

9. The system according to claim 7, further including:

the system further configured to transmit a signal indicative of a locator element becoming non-functional to at least one other functioning locator element when automatic initiation protocols recognize a particular locator element has become non-functional.

10. The system according to claim 9, wherein select locator elements are configured to automatically fill in for select non-functional locator elements upon receiving a signal that a non-functional locator element is not functioning properly.

11. The system according to claim 10, wherein the select locator elements configured to automatically fill in for select non-functional locator elements are preselected when all of the select locator elements are functioning properly.

12. The system according to claim 10, wherein the select locator elements configured to automatically fill in for select non-functional locator elements are chosen based upon availability when a locator element becomes non-functional.

13. The system according to claim 10, wherein the select locator elements configured to automatically fill in for select non-functional locator elements are chosen in accordance with a predefined algorithm.

14. A method for determining a position of a front end of a locomotive consist having a plurality of locomotives, with each locomotive including a directional heading indicator and a locator element, and each locator element communicatively coupled to each other locator element on each other locomotive, the method comprising:

each locator element determining its own location;

each locator element relaying information on its location to at least one other locator element on another locomotive; and each locator element receiving location information on the at least one other locator element, storing a distance from its location to a front end of the locomotive it is on based at least partially upon a signal from the directional heading indicator, receiving information on a total length of each locomotive and associated connectors disposed between the locator element and the front end of the locomotive consist, and determining its own location relative to the front end of the locomotive consist and relative to the location of the at least one other locator element.

15. The method of claim 14, further including:

determining when a particular locator element on one of the locomotives has become non-functional; and transmitting a signal indicative of the particular locator element becoming non-functional to at least one other functioning locator element on a different locomotive from the locomotive with the non-functional locator element.

16. The method of claim 15, further including:

selecting a functioning locator element on a different locomotive from the locomotive with the non-functional locator element to substitute for the non-functional locator element upon receiving a signal that the non-functional locator element is not functioning properly.

17. The method of claim 16, wherein:

the selected functioning locator element that substitutes for a non-functional locator element is preselected when all of the locator elements are functioning properly.

18. The method of claim 16, wherein:

the selected functioning locator element that substitutes for a non-functional locator element is chosen based upon availability when the particular locator element becomes non-functional.

19. The method of claim 16, wherein:

the selected functioning locator element that substitutes for a non-functional locator element is chosen in accordance with a predefined algorithm when the particular locator element becomes non-functional.

* * * * *